April 27, 1926.  1,582,033
A. GODFREY
CUTTING BY MEANS OF THE OXYACETYLENE OR OTHER SUITABLE JET PROCESS
Filed March 23, 1925   7 Sheets-Sheet 1
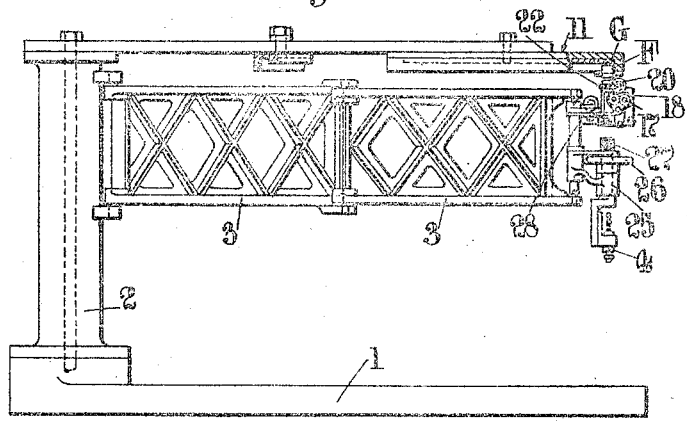

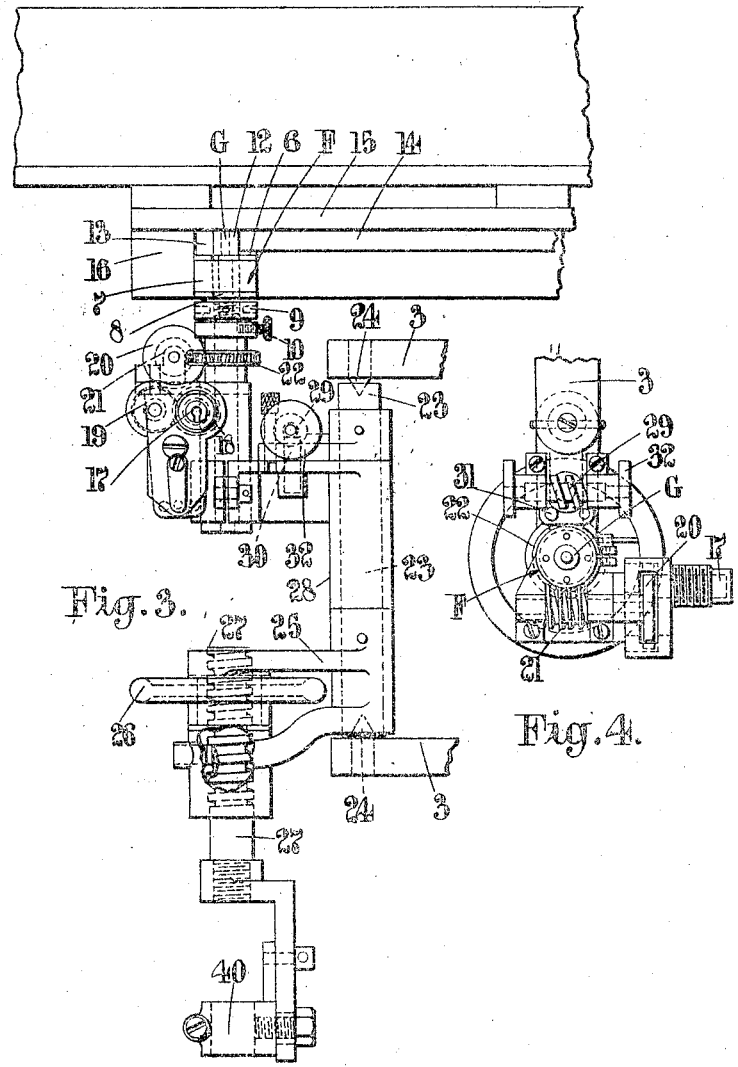

April 27, 1926. 1,582,033
A. GODFREY
CUTTING BY MEANS OF THE OXYACETYLENE OR OTHER SUITABLE JET PROCESS
Filed March 28, 1925 7 Sheets-Sheet 3
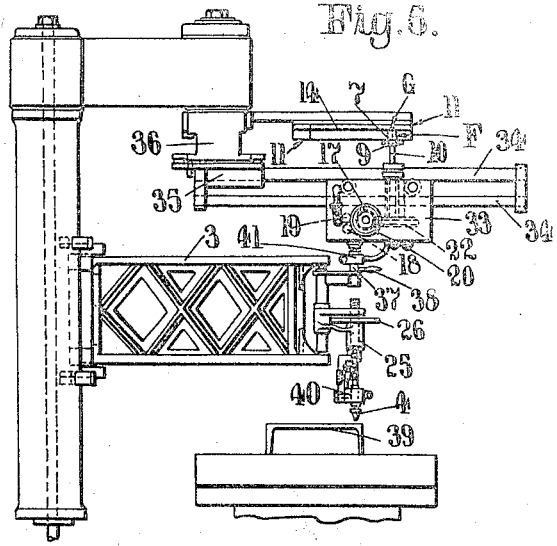
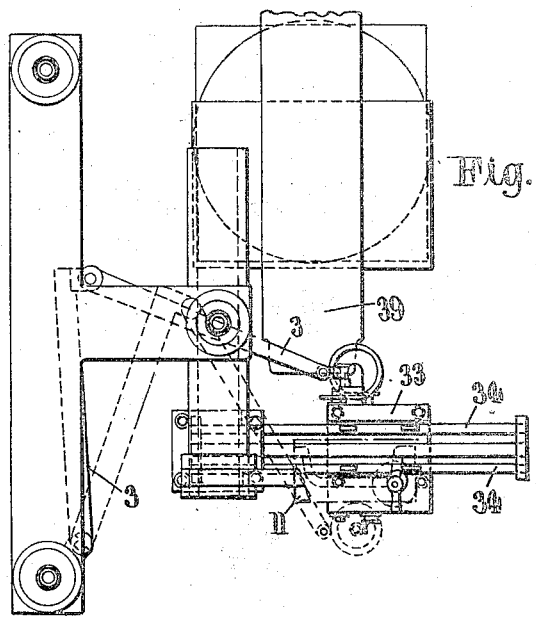
INVENTOR
A. Godfrey
BY
ATTORNEY

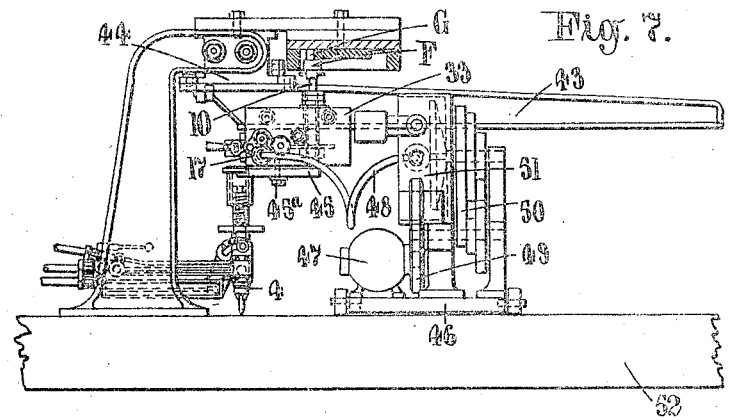
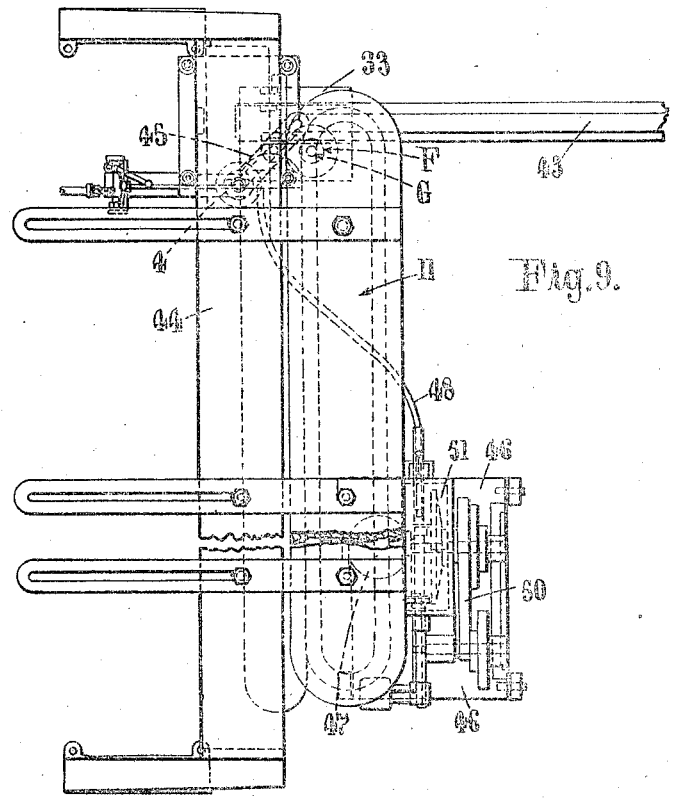

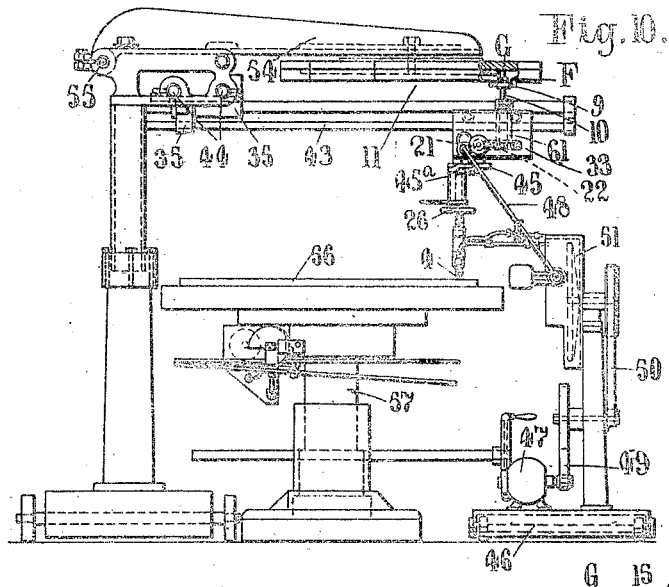
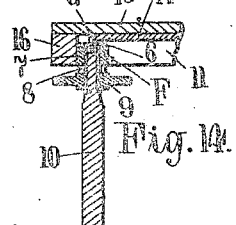
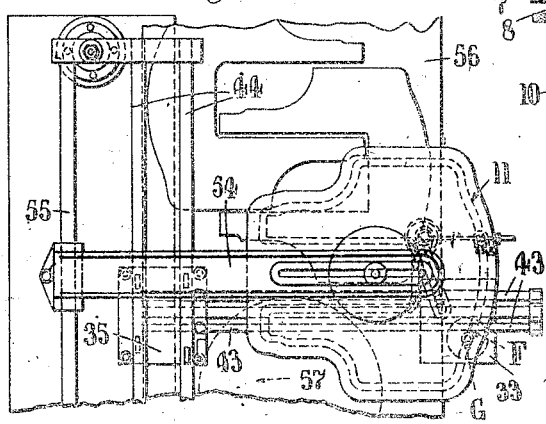

April 27, 1926. 1,582,033
A. GODFREY
CUTTING BY MEANS OF THE OXYACETYLENE OR OTHER SUITABLE JET PROCESS
Filed March 28, 1925 7 Sheets-Sheet 7
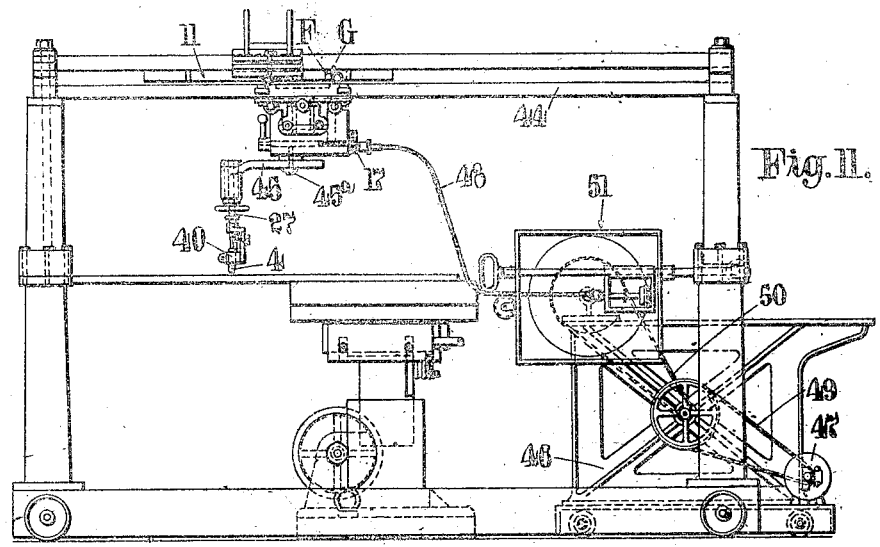
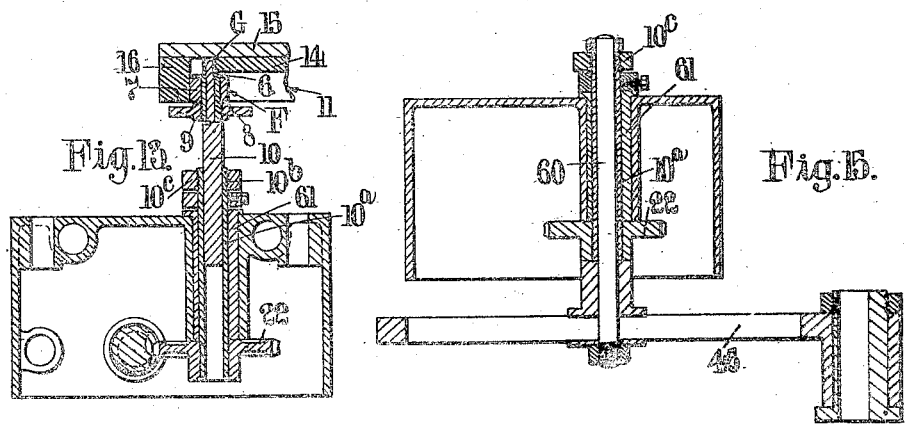
A. Godfrey INVENTOR
BY
ATTORNEY Patented Apr. 27, 1926.

1,582,033

UNITED STATES PATENT OFFICE.

ALFRED GODFREY, OF WOOD GREEN, LONDON, ENGLAND.

CUTTING BY MEANS OF THE OXYACETYLENE OR OTHER SUITABLE JET PROCESS.

Application filed March 28, 1925. Serial No. 19,100.

*To all whom it may concern:*

Be it known that ALFRED GODFREY, a British subject, residing at The Godfrey Engineering Works, Boundary Road, Wood Green, London, England, has invented certain new and useful Improvements in Cutting by Means of the Oxyacetylene or Other Suitable Jet Processes, of which the following is a specification.

This invention relates to cutting by means of oxyacetylene or other suitable gases.

The principal object of the invention is to provide improved means of feeding a blowpipe along predetermined irregular contours or curves at an even speed.

The invention comprises the combination of means to support the blow-pipe at a constant distance from the surface of the workpiece to be cut with a feeding and guiding device comprising a guiding pin or roller, a concentric feeding roller, a templet against which the guiding member is adapted to bear and a surface approximately equidistant at all points from the path set by the templet and engaged by the feeding roller, together with means causing pressure to be applied against the contacting surfaces of the guiding member and the feed roller so that each is pressed against its path. An important novelty of the invention from one aspect lies in the combination of a guiding surface and a feeding surface, a guiding member setting the path followed by the blow pipe and a resilient, or elastic expanding roller or its equivalent, serving both to feed the guiding member along its path and by means of its resilience or elasticity to press the guiding member against its path. Another aspect of the invention comprises a device including a feeding roller, a guide member having a contact surface and axially spaced from the feeding roller, a templet having guiding and feeding surfaces facing towards one another and spaced apart a distance approximately equal to the radius of the feeding roller, (after allowing for the distance of the guiding surface from the centre—i. e. preferably half the thickness of the cut) and resilient means to press the feeding roller and the contact surface of the guide member each against the appropriate surface. The invention also comprises an improved form of templet and generally the improved features, combinations and arrangements embodied in the preferred forms of the apparatus hereinafter described and claimed.

The invention is applicable to the general types of jet cutting machine of my own invention having a jointed frame carrying the blowpipe and guiding and feeding devices above the blowpipe and vertically above the cutting jet or alternatively having a carriage freely movable on slides in two perpendicular directions, but it is not confined to its application to any particular machine, and may form the essential feature of a more simple machine.

Referring to the accompanying drawings illustrating various practical applications of the invention:—

Fig. 1 is an elevation, and

Fig. 2 a plan of a jet cutting machine.

Figs. 3 and 4 show the feed device and blowpipe mounting to an enlarged scale.

Figs. 5 and 6 are respectively an elevation and a plan of an alternative form of machine.

Figs. 7, 8 and 9 are an end and front elevation and a plan respectively of a form of machine able to deal with longer cuts: this form has been designed with the possibility in view of performing heavy cuts on thick plates in situ as well as providing a particularly convenient machine for use in shipyards, dockyards and the like.

Figs. 10, 11 and 12 are corresponding views of a somewhat similar machine.

Figs. 13, 14 and 15 show details of the feed device applied to the machines illustrated in Figs. 5 to 12.

Figure 8:
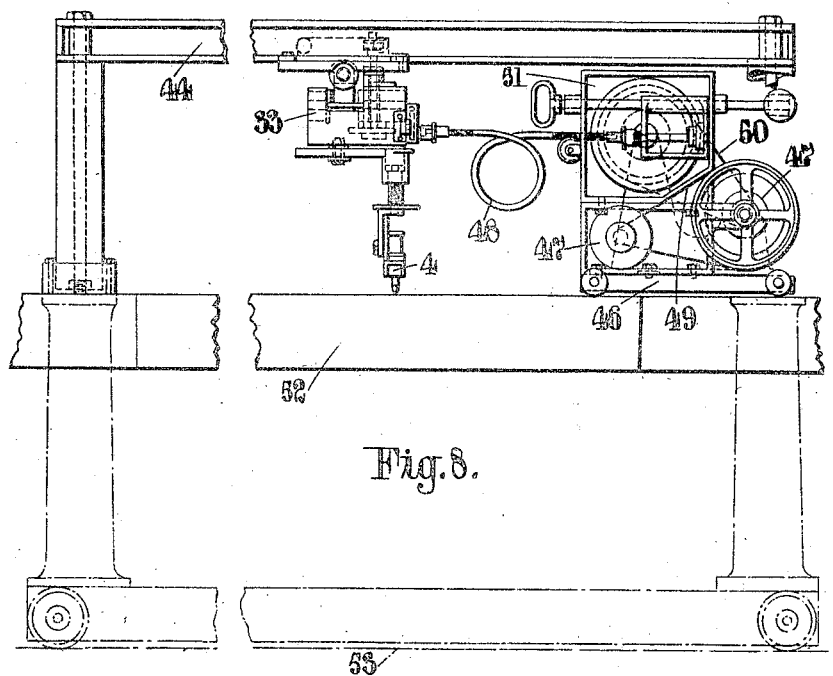
Figure 16:
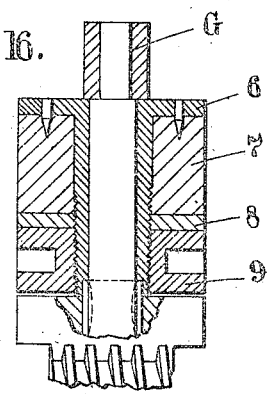
Fig. 16 shows in detail the feed device illustrated in Figs. 3 and 4.

Referring first to the form shown in Figs. 1 to 4, a base 1 supports a column 2 to which is pivoted a jointed arm 3. In other forms the arm may be mounted from a carriage movable on a single or on compound slides. The jointed arm carries at its end the blowpipe head 4, to which it permits free motion approximately parallel to the surface of the work. Vertically above the blowpipe head is mounted a guiding pin or freely revolving roller G which may be interchangeable to suit the width of cut produced by the jet when cutting metal of different thicknesses or to allow a margin for grinding or machining. Immediately below the guiding member and concentric therewith is mounted a feeding roller generally designated F and including an upper flange 6, an intermediate cylindrical pad 7 of rubber or the like, a loose lower flange 8, and a nut 9 upon a screwed portion of the driving spindle 10 so arranged that upon tightening the nut 9 up against the lower flange 8, the rubber (or other material with suitable properties) is compressed between the upper and the lower flange and bulges out to give a resilient driving contact. The driving roller is normally, but not necessarily, larger than the guiding roller and may advantageously be three or four times the diameter of the latter when the normal straight-sided templet is employed with the guiding roller on top. When a fixed pin is used in place of the roller, it is preferably made interchangeable with other pins of different diameters according to the width of the cut, so that its edge will follow a path exactly similar to the edge of the finished piece.

The templet 11 to be used with this device may be approximately of inverted channel form: the inner wall 12 of the channel corresponds to the outline that is to be cut and is arranged to clear the surface of the feed roller while the outer wall 13 is uniformly spaced from the inner wall and extends down sufficiently far to afford a driving surface for the feed roller. For example if a templet is to be made to cut out an irregular shaped aperture in a plate an inner portion 14 is cut conforming with the outline and mounted upon a suitable base 15. A strip 16 is then cut of considerably greater depth with its inner edge uniformly spaced from the edge of the guiding templet when mounted upon the same base. For making straight cuts a straight template 11$^a$ is shown adjustable in the templet support 11$^b$ both as to position and angle. The templet support 11$^b$ may be conveniently carried at the upper part of the supporting pillar, as shown.

Before the device is placed in position in the templet the nut 9 of the feed roller is slacked down and the opposite surfaces of the guiding member and the feed roller fit loosely between the walls of the channel. The nut is then tightened until there is sufficient pressure to give an effective drive and to hold the guiding member against the guiding surface. The drive may be afforded by means of a flexible shaft attached to the socket 17 and tumbler gears 18, 19, 20 giving forward neutral and reverse drives to a worm 21 driving a worm wheel 22 mounted upon the lower end of the feed roller spindle 10.

It will be appreciated that particularly when a closed contour is to be cut it is desirable to insert the rollers from below into the channel and it is further desirable to provide some means of starting the cut off the line of what is to be the finished cut so as to get the cut established and the jet functioning properly before actually entering on to this line. In order to permit of this and also to permit of some independent vertical motion of the blow-pipe a special form of mounting has been devised. Assuming that the parts are all to be mounted at the end of a jointed arm, a vertical spindle 23 is held between steel points 24, 24 or the like at the end of the arm 3. At the lower end of the spindle and fixed to it is a bracket 25 carrying a hand wheel 26 and a screwed spindle 27 at the lower end of which the blow-pipe is mounted and vertically adjustable by means of the hand wheel. The mounting of the blowpipe may further be such as to give it a limited free vertical movement from a wheel running upon the surface of the work. The feed devices already described are mounted from a sleeve 28 free to rotate on the central part of the vertical spindle 23. Fixed to the upper end of the spindle is a further bracket carrying a worm 29 which engages with a short sector or a single formed tooth 30 fixed upon some part rigid with the intermediate sleeve 28. A removable stop 31 is provided to limit the motion of the sector either from one direction or the other according to the position in which it is placed. In either position when the worm is rotated by means of the handle 32 until the stop is reached the guiding member has been brought into position vertically above the jet.

Thus, if an aperture is to be cut in a plate, the templet is mounted immediately over the required position. Preferably, a small hole is drilled to facilitate starting the cut; the feed devices are raised up into position relatively to their supporting sleeve and are clamped at the correct height to engage the templet. The removable stop is placed at the appropriate side and the blow-pipe swung through a small arc relatively to the guiding roller so as to bring its end above the hole already drilled in the plate. As soon as the metal is sufficiently pre-heated the feed is engaged and the cut started, then the blow-pipe is gradually edged to the line of the finished cut by means of the hand worm. As soon as the stop is reached the operator knows that the blow-pipe is on the line of the cut and the feed motion is permitted to continue until the whole piece has been cut out.

Referring next to Figs. 5 and 6 an application is shown to a form of machine which combines the free movement and vertical rigidity obtained by means of the jointed arm with the possibility of tilting the blow-pipe to cut through the work at any required perfectly definite angle and of placing the template away from the blowpipe so as to leave the cutting operation unobstructed. This is done by mounting the blow-pipe at the end of the arm 3 as already described and guiding it by means of a carriage 33 freely movable on cross-slides: the blowpipe will then follow the exact path set by a template situated in any convenient position so long as the jet and the guiding member are both definitely fixed in position relatively to the carriage. The utility of this novel mounting is not confined to the use of any particular form of template or feed device as it is equally applicable to any means whatever of feeding a fixed point in the carriage along a predetermined irregular path. For example a magnetic roller or spring-pressed rollers or a tracing wheel might be employed. As illustrated the carriage 33 runs upon rollers on the transverse slideway formed of rods 34, 34, mounted in the bracket 35 which in turn runs on rollers upon the longitudinal slideway 36. The feed-roller F is preferably driven through a flexible shaft attached to socket 17, tumbler gears 18, 19, 20 etc., and wormwheel 22 on spindle 10 corresponding to those already described in connection with Figs. 1 to 4, but all carried by the carriage 33. The cut is started in a similar manner to that already described, but the hand-operated worm and sector are replaced by an eccentric sleeve 37 integral with the hand lever 38 which is moved sufficiently to bring the jet to the line of the cut (by movement of the jet relatively to the carriage 33) after the feed device has been engaged and the cut started. An additional eccentric sleeve 61, best seen at Fig. 13, may be used for the same purpose in some cases, this sleeve 61 also serving to free the engagement of worm 21 with wormwheel 22 to allow quick positioning of the feed roller anywhere round the templet. In this case the automatic feed comes into action as the jet approaches the line, and the jet is on the line when the feed is fully engaged. The machine is shown forming a shaped end to a channel section 39, the position of and supporting means for the templet 11 being clearly seen in the drawings. When it is desired to cut through the work at an angle the blowpipe head it tilted to the required degree by adjusting the clamp 40 best seen in Fig. 3, and the blowpipe swung round to the desired horizontal angular position: this position is maintained (in a manner impossible where the free arm is the only mounting as in Figs. 1 and 2) by tightening the split collar 41 (Fig. 5) and so fixing the whole blowpipe mounting relatively to the carriage 33.

Referring now to Figs. 7, 8 and 9, the arrangement of the carriage 33 is quite similar to that previously described, the transverse slideway being shown as a girder 43 itself running on the longitudinal slideway 44. But in this case the pivotally jointed frame is altogether dispensed with and the blowpipe supported from the carriage by means of a slotted arm 45 held to the carriage by a bolt 45ᵃ in such a way as to permit of any desired radial or angular adjustment. A convenient form of truck 46 carries the driving motor 47 driving the flexible shaft 48 through the belts 49 and 50 and variable speed friction gear box 51. The machine is represented cutting ventilator holes in the armoured deck 52 of a ship, the carriage following the path set by the template 11 and since the whole arrangement and operation will be quite clear from the description of the other forms already given it is not proposed to go into further detail, corresponding reference letters being applied to corresponding parts.

The dotted portion at the bottom of Fig. 8 shows how the same machine may be used as a portable machine in the yard or shop, the truck 46 then being preferably placed on the ground level represented by the line 53.

Figs. 10, 11 and 12 show a modification of the last form in which rods or tubes form both the transverse slideway 43 and the longitudinal slideway 44. The template 11 is supported by a bracket 54 which is also adjustable along and may be clamped in any position to a rod 55. The machine is shown cutting horn plates out of a plate 56 supported on a rotary table 57.

Figs. 13, 14 and 15 show the improved feed devices and templates in greater detail and also illustrate how the carriage may conveniently be adapted for cutting circles. For this purpose (as well as for vertical movement and adjustment) the feed roller spindle 10 has a tubular portion 10ᵃ driven by the worm-wheel 22. This portion 10ᵃ terminates in a split collet 10ᵇ which can be tightened by means of a nut 10ᶜ upon the upper part of the spindle 10. By releasing the nut the feeding and guiding members can be lowered out of or raised into engagement with the template or completely removed. For circular cutting they are removed and the arm 45 carrying the blowpipe is secured to the tubular shaft by a stud-bolt 60 locked by the nut 10ᶜ. When the worm-wheel is then rotated circles of any desired radius can be cut, the appropriate cutting speed being obtained from the friction gear box or other variable speed device. Non-essential parts of the carriage for the purpose of this explanation are omitted from these views.

I would like it to be understood that I do not wish to confine this invention to the specific forms described but to include alternatives and equivalents within the broad meaning of the claims. For example the feeding surface may be made elastic by the insertion of a suitable facing material in which case the roller itself may be rigid and either the roller or the surface, might be slightly tapered to facilitate engagement; the roller might be provided with a spring pressing it upwardly into position; or the elasticity could be provided in the mounting of a substantially concentric guiding member and feed roller instead of at the surface; in such a case a magnetic feed roller might in some cases be employed, drawing the guiding member rather than pressing it into engagement.

I claim:—

1. In a jet cutting machine means to support the blowpipe at a substantially constant distance from the surface of the work piece in combination with a feeding and guiding device comprising a guiding member, a concentric feeding roller, a template against which the guiding member is adapted to bear and a surface substantially perpendicular to the surface of the work piece and approximately equidistant at all points from the path set by the template and engaged by the feeding roller, together with means causing pressure to be applied against the contacting surfaces of the guiding member and the feed roller so that each is pressed against its path.

2. In apparatus for feeding and guiding a cutting blowpipe along a template, a guiding surface and a feeding surface, a guiding member setting the path followed by the blowpipe and a relatively resilient roller serving both to feed the guiding member along its path and by means of its resilience to press the guiding member against its path, said guiding member and said roller being so arranged that they move at the same speed even on curves of small radius.

3. In apparatus for feeding and guiding a cutting blowpipe along a template, a guiding surface and a feeding surface, a guiding member setting the path followed by the blowpipe, an elastic roller serving both to feed the guiding member along its path and by means of its elasticity to press the guiding member against its path and means to expand the said roller.

4. Apparatus to drive, guide and support a cutting blowpipe, comprising the combination of an expanding elastic driving roller, a guiding piece and a pivotally jointed arm supporting the blowpipe.

5. Apparatus to drive, guide and support a cutting blowpipe, comprising the combination of an expanding elastic driving roller, a guiding piece and a freely moving carriage on compound slides serving to guide the blowpipe.

6. Apparatus to drive, guide and support a cutting blow-pipe, comprising the combination of an expanding elastic driving roller, a guiding piece and a pivotally jointed arm supporting the blowpipe together with a template, and a carriage serving to guide the blowpipe, said driving roller and guiding piece respectively feeding and guiding said carriage along said template.

7. In a jet cutting machine, the improved guiding and feeding device comprising a cylindrical guiding member, a cylindrical feeding roller concentric therewith, a template having substantially parallel faces engaging the opposite sides of the said respective concentric members, and means permitting of sufficient resilience between the points of engagement to give efficient guiding and feeding contact.

8. In a jet cutting machine the improved guiding and feeding device comprising a cylindrical feeding roller, a guide member having a contact surface and axially spaced from the feeding roller, a template having guiding and feeding surfaces facing towards one another and spaced apart a distance approximately equal to the radius of the feeding roller, and resilient means to press the feeding roller and the contact surface of the guide member each in a radial direction against the appropriate surface.

9. In a jet cutting machine a guiding and feeding device adapted to engage between guiding and feeding surfaces and comprising a cylindrical guiding member, and a concentric feeding roller having a contact part of resilient material such as rubber and means to compress the said material so as to cause it to press the guiding and feeding members each outwardly against the appropriate surface, substantially as described.

10. Apparatus for guiding and feeding a blowpipe including a substantially inverted-channel-shaped groove, a pin interchangeable to suit the width of any particular cut and adapted to engage the shorter side of said groove, a feed roller faced with resilient material, concentric with the pin and adapted to engage the longer side of the groove and means to expand and release the resilient material to adjust the pressure and release the device respectively.

11. In apparatus for jet cutting, a blowpipe, means to support the blowpipe in a plane, a template, a guiding device engaging the template, means to move the jet relatively to the guiding device and a stop coming into action when the previously determined line of the cut has been reached.

12. In apparatus for jet-cutting comprising a cutting jet, a feed roller and a mechanical feed for said roller, means to move the jet relatively to said feed roller to bring the jet on to the line of the cut, said means being adapted simultaneously to engage the said mechanical feed of said feeding roller as said jet reaches said line.

13. In apparatus for jet-cutting, the combination of a blowpipe, means to guide said blowpipe along any predetermined course, and a feed roller, said feed roller including an upper and a lower flange with a rubber ring between them and means to press the two flanges towards one another to cause the rubber to bulge for the purpose set forth.

14. A jet cutting machine including a pivotally jointed frame supporting a blowpipe but leaving it free to move in a plane, a mounting pivotally supporting said frame, cross-slides, a carriage freely movable on said cross-slides relatively to the said mounting of the said frame, means to fix the position of the jet relatively to the carriage, and means to feed a fixed point on the carriage along a predetermined irregular path.

15. A jet cutting machine according to claim 14, and having means to incline the blowpipe at a predetermined angle and to fix the inclination relatively to the carriage.

16. In apparatus for feeding and guiding a blowpipe along an irregular course, a guiding surface setting said course, a feeding surface, a guiding member engaging said guiding surface, and a feeding member engaging said feeding surface, the arrangement being such that the velocity of the said guiding member is always equal to the velocity of said feeding member irrespective of the irregularity of said course, and that the surface of contact between said feeding surface and said feeding member is substantially perpendicular to the plane of said course so that said velocity is definitely determinable.

In testimony whereof I affix my signature.

ALFRED GODFREY.